Figure 1:
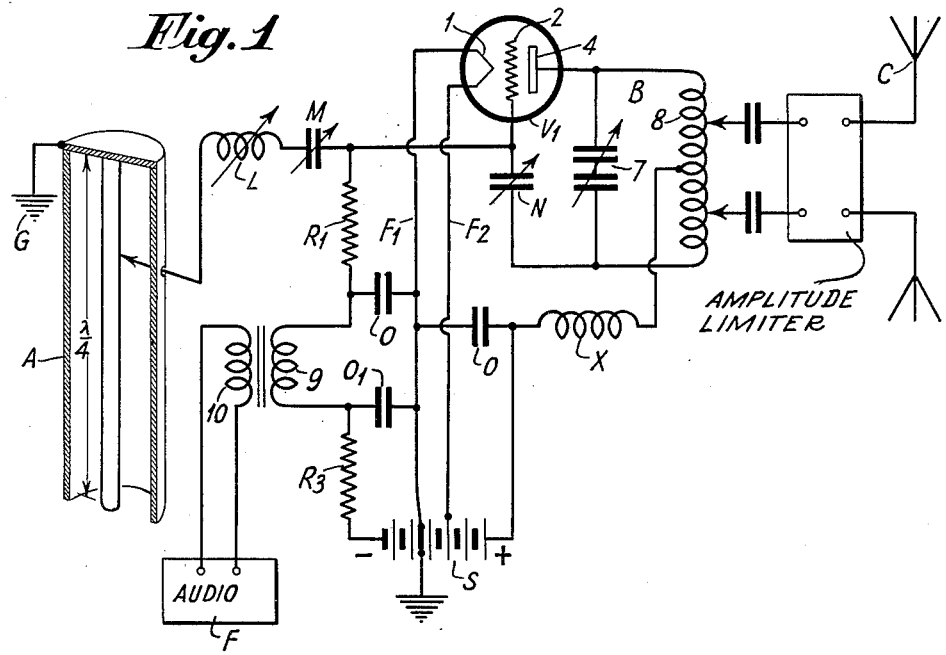

May 23, 1939.  G. L. USSELMAN  2,159,238
PHASE MODULATION
Filed Aug. 14, 1936

INVENTOR
G. L. USSELMAN
BY
ATTORNEY

Patented May 23, 1939

2,159,238

UNITED STATES PATENT OFFICE 2,159,238

PHASE MODULATION

George Lindley Usselman, Port Jefferson, N. Y., assignor to Radio Corporation of America, a corporation of Delaware Application August 14, 1936, Serial No. 96,047

6 Claims. (Cl. 179—171)

The present invention relates to a method of and means for producing oscillations and impressing on said oscillations variations at signal frequency. More in particular, the present invention relates to an improved method of and means for producing oscillations of the desired frequency, varying the phase of the produced oscillations at signal frequency and if necessary, removing any amplitude modulations caused during said phase modulation process. The phase modulated oscillations may be utilized in any manner, for example they may be transmitted.

Systems for producing oscillations and for modulating the same in phase at signal frequency have been known heretofore in the art. In my United States application Serial #607,932, filed April 28, 1932, Patent #2,036,164, issued March 31, 1936, I have shown a method of and means for producing phase modulated oscillations. The means includes a separate source of high frequency oscillations connected by way of phase shifting lines to a thermionic phase modulator including a pair of thermionic tubes having their control grids connected substantially in phase to the oscillator by way of said lines and their anodes connected in parallel. In my United States application Serial #602,487, filed April 1, 1932, now Patent #2,049,143 dated July 28, 1936, I have shown another system for producing oscillations, the phase of which varies at signal frequency. In this system the oscillations are applied from a separate source substantially in phase opposition to the control grids of a pair of thermionic tubes having their anodes connected in push-pull relation by way of a common tank circuit.

The present invention involves a method of and means for producing high frequency oscillations and for varying the phase of said oscillations at signal frequency by means of a single electron discharge tube. In this respect and in others the present system differs from the systems disclosed in the applications referred to above and from my United States application Serial #671,481, now Patent #2,065,842.

In accordance with the invention disclosed in said last named application, I connect the control grids of a pair of tubes to selected points on a resonant line in which sustained oscillations of the desired frequency are produced and fed to the control grids. Sustained oscillations in this line are insured by the dimensions of the line, by the power factor of the line, and by providing coupling between the output electrodes of said tubes and said line in addition to the internal coupling in the tubes between the output and input electrodes where necessary. The output electrodes of the tubes are connected in opposition through a common tank circuit, the phase of the energy in which is determined by the relative conductivity, impedance, etc., of the tubes. The conductivity, impedance, capacity, etc., of the tubes are in turn determined by the signal frequencies which are supplied in phase opposition to the tube impedances. The signal frequencies may be applied to the control grids or other electrodes of the tubes, which may be triodes or any other type of tubes known today. All that is necessary is that the tubes include the necessary control elements and output elements.

In the present invention I connect a control electrode of a single tube by way of a phase displacing reactance to a low loss resonant circuit or line adapted to carry large oscillating energy with small energy dissipation per cycle of oscillating energy. In other words, in the circuit there is maintained a large amount of oscillatory energy compared to the amount of energy lost per cycle. Oscillations are produced in the line or circuit and fed to the control electrode of the tube and from the control electrode to the line. Sustained oscillations are insured by the dimensions of the line or circuit, inter-electrode coupling in the tube and external of the tube where necessary. The output electrode is coupled to a tuned output circuit. By modulating the tube impedance the phase of the grid excitation relative to the phase of the currents in the circuit or line is varied. This results in phase modulation of the produced oscillations. Some amplitude modulation may occur and an amplitude limiter is connected between the output of the generator and modulator and the point at which the modulated energy is used. In a modification the output circuit is coupled to the low power factor circuit or line.

The novel features of the present invention have been pointed out with particularity in the claims appended hereto.

Figure 2:
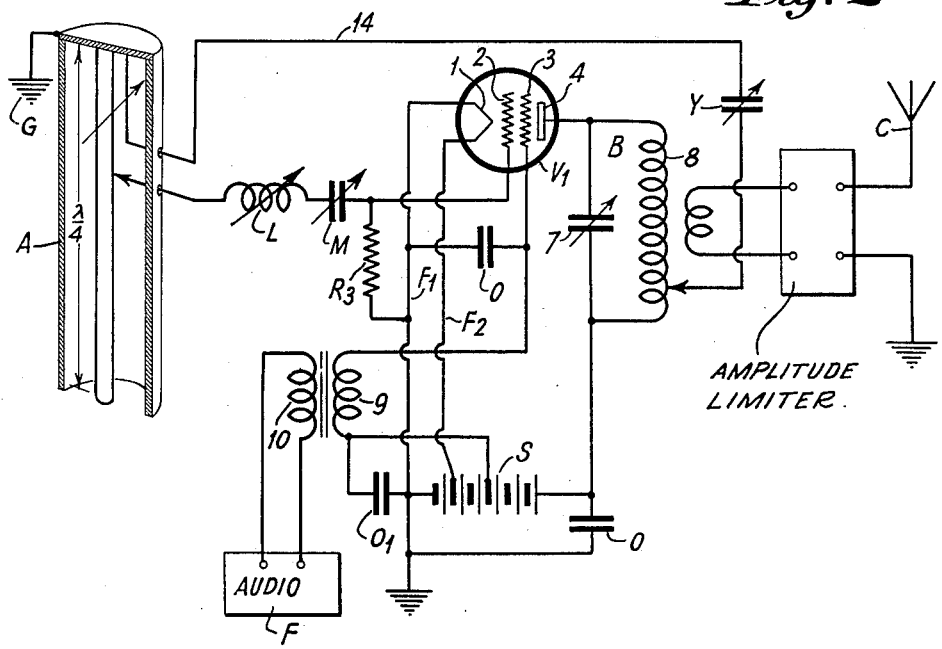

The nature of the invention and the mode of operation thereof, etc., will be better understood by the following detailed description, and therefrom when read in connection with the drawing, throughout which like reference symbols indicate like parts, and in which:

Figure 1 is a circuit diagram of an oscillation producing and phase modulating system illustrative of the present invention; while, Figure 2 shows a modification of the system of Figure 1.

In Figure 1, A represents a resonant line, one end of which is open, as shown, and the other end of which may be connected to ground G. This line A, should be in length, for best results, an odd number of quarter wave lengths of the desired operating frequency. At some suitable distance from the grounded end of line A, I connect, as shown, two series phase shifting elements L and M. The element L may be inductive in nature, while the element M may be capacitative in nature and both may be variable. The ends of element M and L remote from the line A are connected, as shown to the grid electrode 2 of a tube $V_1$, and to the end of $R_1$. The other end of resistor $R_1$ is connected to the secondary winding 9 of a transformer T and is grounded for radio frequency currents by way of a radio frequency by-pass condenser O to the filament lead $F_1$ of leads $F_1$, $F_2$ which are connected with the filament 1 of the tube $V_1$ and with a portion of the source of power S. Negative bias is supplied to the grid 2 of tube $V_1$ by way of the resistor $R_1$ and the secondary winding of transformer T which is connected to S by way of a resistance $R_3$ as shown. The cathode or filament 1 of tube $V_1$ is maintained at ground potential by connecting the lead $F_1$ to the battery S and to ground G. Modulating potentials from a source F may be impressed on the primary winding of transformer T.

The anode 4 of tube $V_1$ is connected to tank circuit B, as shown. The tank circuit B includes an inductance 8 and a variable tuning capacity 7 in parallel. The anode 4 of tube $V_1$ is connected by way of a neutralizing condenser N to the control grid 2 of tube $V_1$.

In some cases it is desirable to over-neutralize or under neutralize N to thereby produce regeneration in the tube and circuits to enhance the production of oscillations by supplementing the transfer of energy back and forth between the line A and the tube by feedback potentials in the tube. Space current for the anode 4 is supplied by way of the mid-tap of inductance 8 and radio frequency choking inductance X from the positive terminal of the source S. The inductance X prevents parasitic push-pull oscillations from being set up in the tubes and circuits including the anodes. Radio frequency oscillations appearing in the tank circuit B, which may get through the choking inductance X, are shunted from the source S by way of a by-passing condenser 2 connected, as shown, between X and the filament lead $F_1$. Audio frequency potentials are shunted around $R_3$ and S by by-pass condenser O.

In practice, a comparatively small amount of energy is dissipated in the line A and said line operates with a comparatively high volt high amperage in it. The line A is, as stated before, of a length equal to an odd number of quarter lengths of the desired operating frequency. The line A is, as shown, connected to the control grid of tube $V_1$ so that a fly wheel effect is produced in said tube and said line or circuit. The tube feeds energy to the line continuously to maintain the line current in a state of oscillation. The oscillations in the line in turn feed energy to the control grid of the tube so that the fly wheel effect, that is, the feeding of energy between the line and the tube and the tube and the line, is continuous. The excitation energy received by grid 2 passes through the inductive element L and capacitive element M which, if tuned inductive, retards the energy so that the energy fed to the control grid 2 is lagging in phase with respect to the energy in the line A. Consequently, the energy fed by the anode 4 to the tank circuit B will be lagging in phase with respect to the current in the line A. If the reactances L and M are adjusted to be capacitive as to the normal period of line A the excitation energy fed by the line A to the grid 2 of tube $V_1$ is advanced in phase. Consequently, the energy fed from the anode 4 of tube $V_1$ to tank circuit B is leading in phase with respect to the energy in the line A. The oscillations in line A assume an average phase position undisturbed by the modulating frequencies on the grid 2.

Now assume that signal frequencies are present in the source F and are supplied to the primary winding 10 of transformer T. These signal frequencies will be applied by way of the secondary winding 9 to the control grids 2 and cathode 1 of tube $V_1$. The bias on grids 2 will be modulated by the current in the secondary winding 9 of transformer T and resistor $R_1$.

This will modulate the control electrode to cathode impedance or resistance of tube $V_1$ which is in series with the phasing reactances L and M and the line or circuit A of low power factor. Variations in the impedance or resistance of this circuit varies the phase angle of the energy therein relative to the phase of oscillation of line A. Consequently, the energy fed to tank circuit B varies in phase at signal frequency relative to the phase of the oscillations in A. The reactances L and M limit the extent of the phase variations at signal frequency and also the direction of phase variation relative to the phase of the energy in A depending on whether L and M is capacitive or inductive. In this way the signal frequency appears in the transmitted or radiated energy as phase modulation of the carrier frequency. Obviously, the phase of the energy in the tank circuit will shift relative to a mean phase position at a rate dependent upon the frequency of the modulating currents and to an extent dependent upon the amplitude of the modulating currents limited by the initial phase shift produced by the phase shifting elements L and M.

The signals in T may comprise intelligible voltages such as speech frequencies or may comprise oscillations of a single frequency or several distinct frequencies. In the latter case the grid circuit of $V_1$ may be keyed or modulated or said single frequency may be keyed or modulated by intelligible signals, or separate signals may be keyed or modulated on each of said distinct frequencies. As an alternative the output of tube $V_1$ may be followed by keying or modulation means when non-intelligible frequencies are supplied by F to wobble the wave produced in A and $V_1$ to gain the benefits of frequency or phase diversity.

While I have shown my system as utilizing a tube of the triode type, it will be understood that my invention is not limited to the use of such tubes. Obviously, other tubes, as, for example, tubes of the screen grid type or pentode type, may be used. Furthermore, when such tubes are used, the modulating potentials may be applied to the control grids or to the anodes or to the screen grid electrodes in said tubes rather than to the control grids, as shown in the circuit which illustrates the invention. Furthermore, feedback, in addition to the internal coupling between electrodes in the tubes, may be provided in a manner different than shown. For example, the feedback energy may be supplied by way of the auxiliary electrodes.

Figure 2 differs from Figure 1 in several respects. The tube V₁ is of the screen grid type and has an auxiliary screening electrode 3. The secondary of transformer T is connected between 3 and a positive point on S. R₃ is omitted. The modulating potentials work into the screen grid to cathode impedance of the tube. Excitation voltage is supplied to line A from inductance 8 in tank circuit B by line 14, coupling condenser Y and variable inductance or conductor VC coupled to the grounded end of line A. This coupling should be variable in order that the amount of energy fed back may be adjusted. Likewise, the coupling between 8 and 14 should be adjustable and the coupling should be of proper phase relation to obtain maximum oscillation efficiency in the line A. The operation of the circuit of Figure 2 is substantially similar to the operation of the circuit of Figure 1 and needs no further explanation.

In both arrangements working on the tube impedance may produce some amplitude modulation. For this reason it is preferable to couple the output of V₁ as shown to the load circuit C by way of a current limiting means such as for example an over-loaded stage in which the amplitude variations are removed. The current limiter may include power amplifiers and frequency multipliers, and the load C may be replaced by transmission lines. In both systems the line A must have large circulating volt-amperes compared to its power loss so that the fly wheel action maintained between the tubes V₁ and V₂ and line A is of large amplitude and sustained. The inner conductor of the line A may be a solid rod or bar or a hollow pipe or cylinder made of conducting material.

The oscillations are produced in the system of Figure 2 and modulated in the same manner in which they are produced in Figure 1 and a description thereof is thought unnecessary at this point.

It should also be noted that either one but not both phase shifting elements L or M may be omitted in Figures 1 or 2 without destroying the effectiveness of the circuits as phase modulators. In case phase shifting element M is omitted, a direct current blocking condenser should replace it to prevent grounding the grid bias voltage. The combination of phase shifting elements L and M is shown in Figures 1 and 2 to show only the possibilities of the combination and to broaden the disclosure.

I claim:

1. An oscillation producing and phase modulating system comprising in combination, a low loss line the length of which is an odd number of quarter wavelengths of the oscillations to be produced, said line having low energy loss per cycle of oscillatory energy compared with its oscillatory energy content, an electron discharge device having an anode, a cathode, and a control electrode, a phase shifting series reactance coupling said controlling electrode to a point on said low loss line, a connection between the cathode of said tube and another point on said low loss line, an output circuit connected between the anode and cathode of said tube, a source of modulating potentials coupled between the cathode of said tube and another electrode in said tube, a load circuit and an amplitude limiter coupled between the output circuit and said load circuit.

2. In a phase modulation system in combination a low loss circuit having inductance and capacity and being adapted to carry a large amount of oscillatory energy with small dissipation per cycle of said oscillatory energy so as to have a fly-wheel effect, an electron discharge device having a control grid, a cathode, and an anode, a phase shifting reactance connecting said control grid to a point on said circuit, a connection between another point on said circuit and the cathode of said tube, an output circuit connected between the anode and cathode of said tube, means coupling said output circuit to said low loss circuit to feed energy from said output circuit to said low loss circuit, and means for applying modulating potentials to the internal impedance of said tube.

3. In a phase modulation system in combination, a low loss resonant line comprising concentric metallic members the length of which line is equal to an odd number of quarter wavelengths, an electron discharge device having a control grid, a cathode and an anode, a phase shifting reactance connecting said control grid to a point on one of said members, a connection between the cathode of said tube and a point on the other of said members, an output circuit connected between the anode and cathode of said tube, a source of modulating potentials, an impedance and a resistance in series between the control grid and cathode of said tube and means for impressing modulating potentials from said source on said impedance.

4. In a phase modulation system, in combination a resonant line the length of which is an odd number of quarter wavelengths, said resonant line having low energy loss per cycle of oscillatory energy compared with the oscillatory energy therein, an electron discharge device having a control grid, a cathode, an anode, and a screen grid electrode, a phase shifting reactance coupling the control grid to a point on said line, a direct connection between another point on said line and said cathode, an output circuit connected between said anode and cathode, a feedback circuit coupling a point on said output circuit to said line, an impedance connected between the screen grid and cathode of said tube and a source of modulating potentials connected with said impedance.

5. In a phase modulation system in combination, a resonant line comprising concentric metallic members, an electron discharge tube having a control grid, a cathode, and an anode, a phase shifting reactance connecting said control grid to a point on one of said members, a connection between the cathode of said tube and a point on the other of said members, an output circuit connected between the anode and cathode of said tube, a source of modulating potentials, a circuit including a modulation potential frequency reactor connected between said control grid and cathode, means for impressing modulating potentials from said source on said modulating potential reactor, and means for neutralizing the capacity between the anode and control grid electrodes of said tube.

6. A system as recited in claim 5 wherein said phase shifting reactance comprises a variable inductance and a variable capacity in series between the control grid of said tube and a point on one of said members.

GEORGE LINDLEY USSELMAN.